(12) United States Patent
Li

(10) Patent No.: US 9,388,057 B2
(45) Date of Patent: Jul. 12, 2016

(54) LATCHING METHOD ENSURING DEVICE CAN BE SEALED RELIABLY AND ULTRA-VIOLET LIQUID PROCESSING DEVICE

(75) Inventor: Yonghao Li, Shenzhen (CN)

(73) Assignee: SHENZHEN XINGRISHENG INDUSTRIAL CO., LTD. (CN)

( * ) Notice: Subject to any disclaimer, the term of this patent is extended or adjusted under 35 U.S.C. 154(b) by 155 days.

(21) Appl. No.: 14/383,890

(22) PCT Filed: Mar. 9, 2012

(86) PCT No.: PCT/CN2012/072158
§ 371 (c)(1),
(2), (4) Date: Sep. 8, 2014

(87) PCT Pub. No.: WO2013/131281
PCT Pub. Date: Sep. 12, 2013

(65) Prior Publication Data
US 2015/0014550 A1  Jan. 15, 2015

(51) Int. Cl.
*C02F 1/00* (2006.01)
*C02F 1/32* (2006.01)
*H01J 61/32* (2006.01)

(52) U.S. Cl.
CPC ........... *C02F 1/325* (2013.01); *C02F 2201/004* (2013.01); *C02F 2201/3223* (2013.01); *H01J 61/325* (2013.01)

(58) Field of Classification Search
CPC ............... C02F 1/325; C02F 2201/004; C02F 2201/3223; H01J 61/325
USPC ................... 250/428, 432 R, 435, 436, 504 R
See application file for complete search history.

(56) References Cited

U.S. PATENT DOCUMENTS 6,402,964 B1 * 6/2002 Schmid ................... C02F 1/325
210/198.1

* cited by examiner

*Primary Examiner* — Michael Maskell
(74) *Attorney, Agent, or Firm* — PROI Intellectual Property US

(57) ABSTRACT

A ultra-violet liquid processing device comprises a liquid processor, a lamp holder, a latching mechanism provided within the lamp holder, and a lamp holder fixed cover provided with a lock hole therein. The latching mechanism comprises a locking dog able to extend from or retract into the lamp holder and a water nozzle blocker. When the lamp holder is pressed on the liquid processor and connected with the liquid processor by lamp holder fixed cover, the locking dog projects from the lamp holder and enter into the lock hole of the lamp holder fixed cover, so that the lamp holder fixed cover is locked and cannot move. By means of the lamp holder fixed cover being locked by the latching mechanism and not able to be moved, the ultra-violet liquid processing device is sealed reliably by means of the substantial structure.

22 Claims, 8 Drawing Sheets

LATCHING METHOD ENSURING DEVICE CAN BE SEALED RELIABLY AND ULTRA-VIOLET LIQUID PROCESSING DEVICE

CROSS REFERENCE TO RELATED APPLICATION

The present application is a Section 371 National Stage Application of International Application No. PCT/CN2012/072158, filed on Mar. 9, 2012 and published as WO 2013/131281 on Sep. 12, 2013, not in English, the contents of which are hereby incorporated by reference in their entirety.

TECHNICAL FIELD

The invention relates to a method enabling a liquid processing device to be reliably sealed as well as a liquid processing device realizing this method, in particular, a method of sealing the liquid processing device reliably by means of latching method as well as the liquid processing device using this method.

BACKGROUND ART

Ultra-violet liquid processing device with the prior art comprises a lamp holder installed with a UV lamp, as well as a liquid processor for holding the liquid to be purified. After the liquid to be purified enters the liquid processor, it is radiated by a UV lamp, and bacteria and algae in the liquid are killed under the UV radiation. Thus, liquid bactericidal and algae removal treatment is realized. The liquid after bactericidal and algae removal treatment discharges from the liquid processor. A sealing element is arranged between the said lamp holder and the liquid processor, and the said lamp holder is assembled to the liquid processor by virtue of threads or a cassette keel. UV liquid processing device is sealed by virtue of the extrusion force between the lamp holder and the liquid processor as well as the sealing element. To ensure the reliable seal, the ultra-violet liquid processing device with the prior art is also arranged with a prompt structure, so that users can confirm whether or not the device is assembled in place, namely sealed. However, the said prompt structure with the prior art is not obvious enough, and role of the prompt structure can only actually be worked when users pay attention to the sealing problem inwardly, so the said prompt structure is not the substantive structure ensuring assembly in place. If users fail to take notice of the prompt information of whether or not the lamp holder at the prompt structure is assembled in place due to negligence, it is unable to ensure that the said lamp holder is really assembled in place and reliably sealed. Obviously, if the lamp holder can't be assembled in place, it can't be reliably sealed, leading to leakage of liquid in the liquid processor, lowering liquid processing efficiency.

Besides, in the operation process, the situation that the lamp holder is directly removed from the liquid handler without disconnecting liquid source due to negligence is easy to occur. Under such situation, leakage of the liquid to be purified will also occur, reducing liquid processing efficiency. Nevertheless, project is not taken for the UV liquid processing device with the prior art, so as to avoid the occurrence of such situation.

CONTENT OF THE INVENTION

The invention is intended to solve the technical issues by means of avoiding the deficiencies of the above the prior art, and put forward a method of ensuring the lamp holder to be materially assembled in place on the liquid processor by means of latching, as well as a UV liquid processing device with this method, enabling the latching mechanism to be locked up only when assembled in place; meanwhile, the said latching mechanism and its latching method can further ensure that, the latching mechanism can be unlocked only when liquid source is disconnected, and the liquid source can only be connected when the latching mechanism is locked up.

The invention can solve the said technical issues with the following technical proposals:

Implement a latching method ensuring that the UV liquid processing device is reliably sealed. The said UV liquid processing device comprises a deep cylindrical liquid processor, a lamp holder installed with a UV lamp, as well as water nozzles interconnected with the interior of the liquid processor. The said lamp holder is installed on the liquid processor. The said water nozzle comprises a water inlet nozzle and a water outlet nozzle. And the said method comprises the following steps:

A. set a lamp holder fixed cover, so that the lamp holder fixed cover can press the lamp holder on the said liquid processor, to ensure the seal, and enable the said lamp holder fixed cover to be detachably connected to the said liquid processor;

B. in the process of implementing the said Step A, at least one lock hole is arranged on the said lamp holder fixed cover;

C. set a latching mechanism comprising a locking dog in the said lamp holder. The locking dog can stretch out from the lamp holder and retract into the said lamp holder, so that when the said lamp holder fixed cover is pressed on the said lamp holder and connected to the said liquid processor, the said locking dog can stretch out from the lamp holder and enter the lock holes of the lamp holder fixed cover. Thus, the said lamp holder fixed cover is locked and can't move.

To realize the function that, the UV liquid processing device is connected to the liquid source only when assembled in place, and the liquid source must be disconnected before disassembly, the said method also comprises the following steps by means of water nozzle blocking:

D1. set a water nozzle stopper for the latching mechanism stated in Step C, and enable the water nozzle stopper to be ganged with the said locking dog. When the said locking dog retracts into the lamp holder, the said water nozzle stopper can block the water nozzle; when the said locking dog stretches out from the lamp holder and enters the lock holes of the lamp holder fixed cover, the said water nozzle stopper along with the locking dog can move to the position where blocking of the water nozzle is relieved.

Or, the said method also comprises the following steps by means of hindering the installation of external pipe:

D2. Set a water nozzle stopper for the latching mechanism stated in Step C, and enable the water nozzle stopper to be ganged with the said locking dog. When the said locking dog retracts into the lamp holder, the said water nozzle stopper can hinder the installation of external pipe on the said water nozzle; when the said locking dog stretches out from the lamp holder, and enters the lock holes of the lamp holder fixed cover, the said water nozzle stopper moves to the position where external pipe can be installed on the said water nozzle.

When a tubular water nozzle is arranged at the top of the said lamp holder, the above Step D2 by means of hindering the installation of external pipe comprises the following substeps:

D21. Set a water nozzle stopper comprising a catch for the said latching mechanism. The said water nozzle stopper is installed at the top of the lamp holder, and can be ganged with the said locking dog to move at the top of the lamp holder, so that when the locking dog retracts into the said lamp holder, catch of the said water nozzle stopper is close to the pipe external wall of the water nozzle, hindering the external pipe from being encased on the said water nozzle by virtue of the radial width of the catch top along the water nozzle. When the said locking dog stretches out from the lamp holder and enters the lock holes of the lamp holder fixed cover, catch of the said water nozzle stopper moves toward the direction far away from the external pipe wall of the water nozzle. Thus, a gap is formed between the catch and the pipe external wall of the water nozzle, enabling the external pipe to be encased on the said water nozzle.

When at least one water nozzle is set on the said lamp holder, in the said Step D, connect the said water nozzle stopper securely on the locking dog stated in Step C, so as to enable the water nozzle stopper to be ganged with the locking dog.

A protruding ridge is arranged at the external wall of the said lamp holder. When the lamp holder is installed on the liquid processor, the said protruding ridge is erected at the opening edge of the said liquid processor. To realize the function that, the lamp holder fixed cover presses the lamp holder on the liquid processor, and the said Step A comprises the following substeps, A1. fabricate the said lamp holder fixed cover into tubular shape. Inner wall of the lamp holder fixed cover comprises the top inner wall at the upward side, and the bottom inner wall at the downward side. Enable shape of the said top inner wall to be identical to that of the external wall of the said lamp holder above the protruding ridge, and shape of the said bottom inner wall to be identical to that of the external wall of the said liquid processor. Thus, a gland ring surface is formed between the top inner wall and bottom inner wall of the lamp holder fixed cover. When the said lamp holder fixed cover is encased on the lamp holder installed on the said liquid processor, by virtue of the said gland ring surface pressed on the protruding ridge of the said lamp holder, the said lamp holder fixed cover presses the lamp holder on the said liquid processor, to ensure the seal, and is detachably connected to the said liquid processor.

At least one buckle convex protruding from the outside of the liquid processor is arranged on the external wall of the said liquid processor. The said Step A comprises the following substeps, A2. fabricate a lamp holder fixed cover whose bottom is provided with a tubular bottom enclosure wall. Enable shape of the inner wall of the said bottom enclosure wall to be identical to that of the external wall of the liquid processor. And set at least one buckle slot denting to the outside of the lamp holder fixed cover at the inner wall bottom of the said bottom enclosure wall. The buckle slot comprises an entry slot and a latching slot interconnected with the entry slot. Notch of the said entry slot is downward, and extends to the top of the lamp holder fixed cover. Notch of the latching slot is interconnected with the top of the entry slot. Extension direction of the latching slot is perpendicular to that of the entry slot. Thus, by virtue of the buckle convexes sliding from the entry slots into the latching slots, the said lamp holder fixed cover is detachably connected to the liquid processor.

Step B stated in one proposal comprises the following steps,

B1. Fabricate a tubular lamp holder fixed cover, and process at least one notch denting downward at the top of the lamp holder fixed cover, the notch is the said lock hole;

The said Step C comprises the following substeps,

C1. Set a latching mechanism comprising a locking dog inside of the said lamp holder. The locking dog can stretch out from and retract into the said lamp holder from the side of the lamp holder. When the said lamp holder fixed cover compresses the said lamp holder and is connected to the said liquid processor, the said locking dog can stretch out from the lamp holder, and enter into the lock holes of the lamp holder fixed cover, restricting the said lamp holder fixed cover from making upward displacement by virtue of the bottom edge of the lock holes, meanwhile, restricting the said lamp holder fixed cover from rotating by virtue of the vertical walls at both sides of the said lock holes.

To position and install the lamp holder on the liquid processor, and prevent the lamp holder from rotating, the said method also comprises the following substeps, E. set a standstill locking component respectively on the said liquid processor and the lamp holder. By virtue of the standstill locking components, the said lamp holder is positioned and installed on the said liquid processor, and fails to rotate in the liquid processor.

Bottom external wall of the said lamp holder and top inner wall of the said liquid processor are directly facing and contacting to each other. And a concrete implementation method of the said step E comprises the following substeps, E11. Process at least one standstill locking groove denting to the interior of the lamp holder at the bottom external wall of the said lamp holder;

E12. Set at least one standstill locking convex protruding to the inside of the barrel at the top inner wall of the said liquid processor. By virtue of the standstill locking convexes inserted into the said standstill locking grooves, the said lamp holder is positioned and installed on the said liquid processor, and fails to rotate in the liquid processor.

Similarly, the other implementation method stated in step E comprises the following substeps, E21. Process at least one standstill locking convex protruding to the outside of the lamp holder at the bottom external wall of the said lamp holder;

E22. Set at least one standstill locking groove denting to the outside of the barrel at the top inner wall of the said liquid processor. By virtue of the standstill locking convexes inserted into the said standstill locking grooves, the said lamp holder is positioned and installed on the said liquid processor, and fails to rotate in the liquid processor.

The invention can also solve the said technical issues with the following technical proposals:

Design and manufacture a UV liquid processing device realizing reliable seal by virtue of latching, comprising a deep cylindrical liquid processor, a lamp holder installed with a UV lamp, as well as water nozzles interconnected to the interior of the liquid processor. The said lamp holder is installed on the liquid processor. The said water nozzle comprises a water inlet nozzle and a water outlet nozzle. In particular, it also comprises a latching mechanism, as well as a lamp holder fixed cover set with lock holes. The said lamp holder fixed cover presses the lamp holder on the said liquid processor, and is detachably connected to the liquid processor. The said latching mechanism is installed in the said lamp holder, comprising a locking dog which can stretch out from the lamp holder or retract into the said lamp holder. When the said lamp holder fixed cover presses the lamp holder on the liquid processor and is connected to the liquid processor, the said locking dog stretches out from the lamp holder and enters the lock holes of the said lamp holder fixed cover, thus, enabling the lamp holder fixed cover to be locked and unable to move.

To realize the function that, the UV liquid processing device is connected to the liquid source only when assembled in place, and the liquid source must be disconnected before disassembly, a proposal by means of water nozzle blocking is that, the said latching mechanism also comprises a water nozzle stopper. The water nozzle stopper is ganged with the said locking dog, so that when the said locking dog retracts into the lamp holder, the said water nozzle stopper can block the water nozzle; when the said locking dog stretches out from the lamp holder and enters the lock holes of the lamp holder fixed cover, the said water nozzle stopper along with the locking dog can move to the position where blocking of the water nozzle is relieved.

To realize the function that, the UV liquid processing device is connected to the liquid source only when assembled in place, and the liquid source must be disconnected before disassembly, a proposal by means of hindering the installation of the external pipe is that, the said latching mechanism also comprises a water nozzle stopper. The water nozzle stopper is ganged with the said locking dog, so that when the said locking dog retracts into the lamp holder, the said water nozzle stopper can hinder the installation of external pipe on the said water nozzle. When the said locking dog stretches out from the lamp holder and enters the lock holes of the lamp holder fixed cover, the said water nozzle stopper moves to the position where external pipe can be installed on the said water nozzle.

A tubular water nozzle is arranged at the top of the said lamp holder. Then, in the above proposal by means of hindering the installation of external pipe, the said water nozzle stopper is also arranged at the top of the lamp holder, comprising a catch. The water nozzle stopper is ganged with the locking dog and moves at the top of the lamp holder, so that when the locking dog retracts into the said lamp holder, catch of the said water nozzle stopper is close to the pipe external wall of the water nozzle. External pipe is hindered to be encased on the said water nozzle by virtue of the radial width of the catch top along the water nozzle. When the said locking dog stretches out from the lamp holder and enters the lock holes of the lamp holder fixed cover, catch of the said water nozzle stopper moves to the direction far away from the pipe external wall of the water nozzle, a gap is formed between the said catch and the pipe external wall of the water nozzle. Thus, external pipe can be encased on the said water nozzle.

At least one water nozzle is arranged on the said lamp holder. Then in the proposals with the above two methods, the said water nozzle stopper is directly connected to the said locking dog, so as to enable the water nozzle stopper to be ganged with the locking dog.

In order that that the lamp holder fixed cover presses the lamp holder on the liquid processor, the said lamp holder comprises a protruding ridge arranged on the external wall of the lamp holder, and protrudes from the outside of the lamp holder. By virtue of the said protruding ridge erected at the opening edge of the said liquid processor, the said lamp holder is installed on the liquid processor. The said lamp holder fixed cover is of hollow tubular shape. Shape of the top inner wall of the lamp holder fixed cover is identical to that of the external wall of the said lamp holder above the protruding ridge, and shape of the bottom inner wall of the said lamp holder fixed cover is identical to that of the external wall of the said liquid handler. Thus, a gland ring surface is formed between the top inner wall and the bottom inner wall of the lamp holder fixed cover. When the said lamp holder fixed cover is encased on the lamp holder installed on the said liquid processor, by virtue of the said gland ring surface pressed on the protruding ridge of the said lamp holder, the said lamp holder fixed cover presses the lamp holder on the said liquid processor, to ensure the seal, and is detachably connected to the said liquid processor.

In order that the lamp holder fixed cover can be detachably connected to the liquid processor, at least one buckle convex protruding outside from the liquid processor is arranged on the external wall of the said liquid processor. The said lamp holder fixed cover comprises a tubular bottom enclosure wall arranged at the bottom of the lamp holder fixed cover. And shape of the inner wall of the said bottom enclosure wall is identical to that of the external wall of the liquid processor. At least one buckle slot denting to the outside of the lamp holder fixed cover is arranged at inner wall bottom of the said bottom enclosure wall. The buckle slot comprises an entry slot, and a latching slot interconnected with the entry slot. Notch of the said entry slot is downward, and extends to the top of the lamp holder fixed cover. Notch of the latching slot is interconnected with the top of the entry slot. Extension direction of the latching slot is perpendicular to that of the entry slot. Thus, by virtue of the buckle convexes sliding from the entry slots to the latching slots, the said lamp holder fixed cover is detachably connected to the liquid processor.

Concrete structure of a lock hole is that, the said lamp holder is of tubular shape, at least one notch denting downward is processed at the top of the lamp holder fixed cover, the notch is the said lock hole. The said locking dog can stretch out from and retract into the lamp holder from the side face of the lamp holder. When the said lamp holder fixed cover compresses the said lamp holder and is connected to the said liquid processor, the said locking dog can stretch out from the side face of the lamp holder, and enter the lock holes of the lamp holder fixed cover, restricting the said lamp older fixed cover from making upward displacement by virtue of the lock holes, meanwhile restricting the lamp holder fixed cover from rotating by virtue of the vertical wall at both sides of the said lock holes.

In order that the lamp holder is installed inside of the liquid processor, and prevent the lamp holder from rotating in the liquid processor, a standstill locking component is respectively arranged on the said liquid processor and the lamp holder. By virtue of the standstill locking components, the said lamp holder is positioned and installed on the said liquid processor, and fails to rotate in the liquid processor.

In order that the lamp holder is installed inside of the liquid processor, and prevent the lamp holder from rotating in the liquid processor, a standstill locking component is respectively arranged on the said liquid processor and the lamp holder. By virtue of the standstill locking components, the said lamp holder is positioned and installed on the said liquid processor, and fails to rotate in the liquid processor.

Bottom external wall of the said lamp holder and top inner wall of the said liquid processor are directly facing to each other. Implementation proposal of a standstill locking component is that, at least one standstill locking groove denting into the lampholder is processed at the bottom external wall of the said lamp holder. At least one standstill locking convex protruding to interior of the barrel is arranged at the top inner wall of the said liquid processor. By virtue of the standstill locking convexes inserted into the said standstill locking grooves, the said lamp holder is positioned and installed on the said liquid processor, and fails to rotate in the liquid processor. Meanwhile, implementation proposal of the other standstill locking component is that, process at least one standstill locking convex protruding from the outside of the lampholder at the bottom external wall of the said lamp holder. Set at least one standstill locking groove denting to the direction far away from the central axis at the top inner wall of the said liquid handler. By virtue of the standstill locking convexes inserted into the said standstill locking grooves, the said lamp holder is positioned and installed on the said liquid processor, and fails to rotate in the liquid processor.

Compared with the existing technology, technical effects of the invention "latching method ensuring reliable device can be sealed reliably and UV liquid processing device" are that:

1. The lamp holder is assembled to the liquid processor in place by virtue of the said lamp holder fixed cover. And after the lamp holder fixed cover is installed, the lamp holder fixed cover is locked by the said latching mechanism and can't move. Thus, in a material way, the UV liquid processing device is ensured to be reliably sealed via the latching mechanism, not affected by subjective factors of users. Poor sealing attributable to the fact that the assembly is not in place is solved, preventing the leakage of the liquid to be purified and ensuring the liquid purifying effect;

2. Water nozzle stopper of the said latching mechanism is ganged with the locking dog, thus, locking status of the latching mechanism can only be relieved when liquid source is disconnected, and the liquid source can only be connected when the latching mechanism is at locking status, effectively preventing the liquid to be purified from leaking due to operation negligence, further ensuring the liquid purifying effect.

MODE OF CARRYING OUT THE INVENTION MODEL

Figure 1:
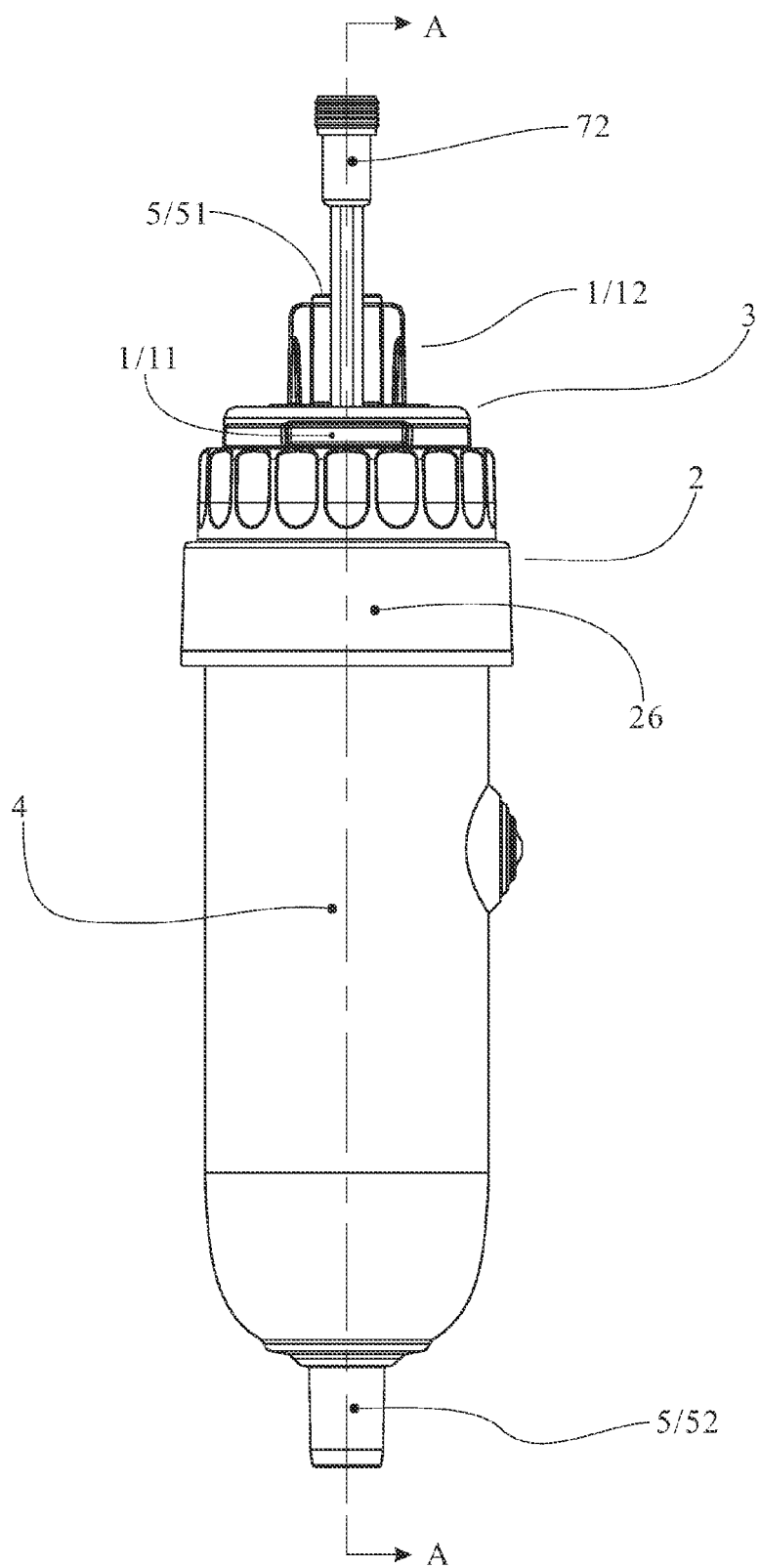
FIG. 1 shows an orthographic front view diagram of the preferred embodiment to the invention "latching method ensuring reliable device can be sealed reliably and UV liquid processing device"

To further illustrate the principle and structure of the invention, the invention is further described in detail in accordance with the preferable embodiments shown in the figures.

The invention presents a latching method ensuring that the UV liquid processing device is reliably sealed. The said UV liquid processing device comprises a deep barrel shaped liquid processor, a lamp holder installed with UV lamp, as well as water nozzles interconnected with interior of the liquid processor. The said lamp holder is installed on the liquid processor. The said water nozzle comprises a water inlet nozzle and a water outlet nozzle. The said method comprises the following steps:

A. set a lamp holder fixed cover, enable the lamp holder fixed cover to press the lamp holder on the said liquid processor, to ensure the seal, and enable the said lamp holder fixed cover to be detachably connected to the said liquid processor;

B. in the process of implementing the said Step A, set at least one lock hole on the said lamp holder fixed cover;

C. set a latching mechanism comprising a locking dog in the said lamp holder. the locking dog can stretch out from the lamp holder and retract into the said lamp holder, so that when the said lamp holder fixed cover is pressed on the said lamp holder and connected to the said liquid processor, the said locking dog can stretch out from the lamp holder and enter the lock holes of the lamp holder fixed cover, enabling the said lamp holder fixed cover to be incapable of moving.

The said lamp holder fixed cover is the component enabling the UV liquid processing device to be assembled in place. A sealing element can be arranged between the lamp holder and the liquid processor. When the lamp holder fixed cover is connected to the liquid processor, the said lamp holder is pressed by the lamp holder fixed cover and can't move. The locking dog in the lamp holder can only stretch out from the lamp holder and stretch into the lock holes of the lamp holder fixed cover when the lamp holder fixed cover is assembled in place. Connect the lamp holder fixed cover and the lamp holder to be an integral, so as to prevent the lamp holder fixed cover from moving. Thus, the substantive structure, namely the latching mechanism is employed to ensure that all components of the UV liquid processing device are assembled in place, realizing reliable seal. Since the lamp holder fixed cover is locked, and fails to rotate and move up and down, the UV liquid processing device is ensured to be reliably sealed during use.

In order to realized the function that, the UV liquid processing device is connected to the liquid source only when assembled in place, and the liquid source must be disconnected before disassembly, the said method also comprises the following steps by means of water nozzle blocking:

D1. set a water nozzle stopper for the latching mechanism stated in Step C, and enable the water nozzle stopper to be ganged with the said locking dog, so that when the said locking dog retracts into the lamp holder, the said water nozzle stopper can block the water nozzle; when the said locking dog stretches out from and enters the lock holes of the lamp holder fixed cover, the said water nozzle stopper moves along with the locking dog to the position where blocking of the water nozzle is relieved.

Or, the said method also comprises the following steps by means of hindering the installation of external pipe:

D2. Set a water nozzle stopper for the latching mechanism stated in Step C, and enable the water nozzle stopper to be ganged with the said locking dog, so that when the said locking dog retracts into the lamp holder, the said water nozzle stopper can hinder the installation of external pipe on the said water nozzle; when the said locking dog stretches out from and enters the lock holes of the lamp holder fixed cover, the said water nozzle stopper moves to the position where external pipe can be installed on the said water nozzle.

Liquid source is conditionally connected or disconnected, when the said water nozzle stopper hinders water flow from passing the water nozzle or hinders installation of external pipe on the water nozzle. Since the water nozzle stopper is ganged with the locking dog, the said condition is the state where the locking dog stays. After the locking dog is locked, namely the UV liquid processing device is assembled in place, can the liquid source by connected. Meanwhile, only when the liquid source is disconnected, can locking status of the locking dog be relieved. Thus, leakage of the liquid to be purified result from disassembly of the said UV liquid processing device without disconnecting the liquid source due to negligence can be effectively avoided.

Corresponding structure of the above water nozzle stopper can be selected as per different use structures, so as to realize its function. When a hollow tubular water nozzle is arranged at the top of the said lamp holder, the above Step D by means of hindering the installation of external pipe comprises the following substeps:

D21. Set a water nozzle stopper comprising a catch for the said latching mechanism. The said water nozzle stopper is installed at the top of the lamp holder, and can move at the top of the lamp holder ganged with the said locking dog, so that when the locking dog retracts into the said lamp holder, catch of the said water nozzle stopper is close to the external pipe wall of the water nozzle, hindering the external pipe from being encased on the said water nozzle by virtue of the radial width from the catch top along the water nozzle. When the said locking dog stretches out from the lamp holder and enters the lock holes of the lamp holder fixed cover, catch of the said water nozzle stopper moves toward the direction far away from the external pipe wall of the water nozzle. Thus, a gap is formed between the said catch and the external pipe wall of the water nozzle, enabling the external pipe to be encased on the said water nozzle.

In the above Step D21, pipe wall of the water nozzle is thickened by taking advantage of the catch top width, thus, external pipe fails to be encased on the water nozzle, so as to realize the function of the water nozzle stopper.

There are several execution modes to realize the linkage between the said water nozzle stopper and the locking dog as per specific application structures. For instance, linkage can be realized by adopting a driver located between the said water nozzle stopper and the locking dog. The simplest structure is to link the water nozzle stopper with the locking dog. When at least one water nozzle is arranged at the said lamp holder, in Step D, linkage between the water nozzle stopper and the locking dog is realized by linking the said water nozzle stopper securely with the locking dog stated in Step C.

The said lamp holder fixed cover can be fabricated with several methods as per specific application structures, so as to press the lamp holder on the liquid processor. External wall of the said lamp holder in the preferred embodiment of the invention is arranged with a protruding ridge. When the lamp holder is installed on the liquid processor, the said protruding ridge is erected on the barrel edge of the said liquid processor. The said Step A comprises the following substeps, A1. Fabricate the said lamp holder fixed cover into hollow tubular shape. Inner wall of the lamp holder fixed cover comprises the top inner wall at the upward side and the bottom inner wall at the downward side. Enable shape of the said top inner wall to be identical to that of the external wall of the said lamp holder above the protruding ridge, and shape of the said bottom inner wall to be identical to that of the external wall of the said liquid handler. Thus, a gland ring surface is formed between the top inner wall and bottom inner wall of the lamp holder fixed cover. When the said lamp holder fixed cover is encased on the lamp holder installed on the said liquid handler, by virtue of the said gland ring surface pressed on the protruding ridge of the said lamp holder, the said lamp holder fixed cover presses the lamp holder on the said liquid handler, to ensure the seal, and is detachably connected to the said liquid handler.

The said lamp holder fixed cover can be fabricated with several methods as per specific application structures, so as to enable the lamp holder fixed cover to be detachably connected to the liquid processor. Preferred embodiment of the invention adopts the method of buckle fixing, at least one buckle convex protruding to the outside of the liquid processor is arranged on the said liquid processor, so the said step A comprises the following substeps, A2. Fabricate a lamp holder fixed cover whose bottom is provided with tubular bottom enclosure wall. Shape of the inner wall of the said bottom enclosure wall is identical to that of the external wall of the liquid processor. And set at least one buckle slot denting to the outside of the lamp holder fixed cover at the inner wall bottom of the said bottom enclosure wall. The buckle slot comprises an entry slot and a latching slot interconnected with the entry slot. Notch of the said entry slot is downward, and extends to the top of the lamp holder fixed cover. Notch of the latching slot is interconnected with the top of the entry slot. Extension direction of the lock catch slot is perpendicular to that of the entry slot. Thus, by virtue of the buckle convexes sliding from the entry slots into the latching slots, the said lamp holder fixed cover is detachably connected with the liquid processor.

Opening method of lock holes on the lamp holder fixed cover shall also be subject to the specific application structures. The invention presents a method of making lock hole on the lamp holder fixed cover.

The said Step B comprises the following steps,

B1. Fabricate a hollow tubular lamp holder fixed cover, and process at least one notch denting downward at the top of the lamp holder fixed cover, the notch is the said lock hole;

The said Step C comprises the following substeps,

C1. Set a latching mechanism comprising a locking dog inside of the said lamp holder. The locking dog can stretch out from and retract into the said lamp holder from the side of the lamp holder, so that when the said lamp holder fixed cover compresses the said lamp holder and is connected to the said liquid processor, the said locking dog can stretch out from the lamp holder, and enter into the lock holes of the lamp holder fixed cover, restricting the said lamp holder fixed cover from making upward displacement by virtue of the bottom edge of the lock holes, meanwhile, restricting the said lamp holder fixed cover from rotating by virtue of the vertical walls at both sides of the said lock holes.

To position and install the lamp holder on the liquid processor, and prevent the lamp holder from rotating, the said method also comprises the following steps, E. set a standstill locking component respectively on the said liquid processor and the lamp holder. By virtue of the standstill locking components, the said lamp holder is positioned and installed on the said liquid processor, and fails to rotate in the liquid processor.

In the preferred embodiment of the invention, bottom external wall of the said lamp holder and top inner wall of the said liquid processor are directly facing and contacting to each other, and a specific execution method of the said Step E comprises the following substeps, E11. Process at least one standstill locking groove denting to the interior of the lamp holder at the bottom external wall of the said lamp holder;

E12. Set at least one standstill locking convex protruding to the interior of the barrel at the top inner wall of the said liquid processor. By virtue of the standstill locking convexes inserted into the said standstill locking grooves, the said lamp holder is positioned and installed on the said liquid handler, and fails to rotate in the liquid processor.

Similarly, the other execution method of the said step E comprises the following substeps, E21. Process at least one standstill locking convex protruding to the outside of the lamp holder at the bottom external wall of the said lamp holder;

E22. Set at least one standstill locking groove denting to the outside of the barrel at the top inner wall of the said liquid processor. By virtue of the standstill locking convexes inserted into the said standstill locking grooves, the said lamp holder is positioned and installed on the said liquid processor, and fails to rotate in the liquid processor.

Based on the above methods, the invention presents a UV liquid processing device realizing reliable seal by virtue of latching, so as to realize the above methods. Take the preferred embodiment shown from FIG. 1 to FIG. 9 for examples, the UV liquid processing device comprises a barrel shaped liquid processor 4, a lamp holder 3 installed with a UV lamp 71, as well as water nozzles 5 interconnected with the interior of the liquid processor. The said lamp holder 3 is installed on the said liquid processor 4. The said water nozzle 5 comprises a water inlet nozzle 52 and a water outlet nozzle 51. In particular, it also comprises a latching mechanism 1, as well as a lamp holder fixed cover 2 set with lock holes 21. The said lamp holder fixed cover 2 presses the said lamp holder 3 on the said liquid processor 4, and is detachably connected to the liquid processor 4. The said latching mechanism 1 is installed in the said lamp holder 3, comprising a locking dog 11 which can stretch out from the lamp holder 3 and retract into the said lamp holder 3. When the said lamp holder fixed cover 2 presses the lamp holder 3 on the liquid processor 4, and is connected to the liquid processor 4, the said locking dog 11 stretches out from the lamp holder 3, and enters into the lock holes 21 of the said lamp holder fixed cover 2, enabling the said lamp holder fixed cover 2 to be locked and incapable of moving.

A seal ring 81 serving as sealing element shall be arranged between the said lamp holder 3 and the liquid processor 4. The said UV lamp 71 gets electric energy by virtue of the power plug 72 led out from the UV liquid processing device via the conductor.

To realize the function that, the UV liquid processing device can only be connected to the liquid source when assembled in place, and the liquid source must be disconnected before disassembly, the proposal by means of water nozzle blocking is that, the said latching mechanism 1 also comprises a water nozzle stopper 12. The water nozzle stopper 12 is ganged with the said locking dog 11, so that when the said locking dog 11 retracts into the lamp holder 3, the said water nozzle stopper 12 can block the water nozzle 5; when the said locking dog 11 stretches out from the lamp holder 3 and stretches into the lock holes 21 of the said lamp holder fixed cover 2, the said water nozzle stopper 12 can move together with the locking dog 11 to the position where blocking of the water nozzle 5 is relieved. Water nozzle stopper 12 stated in the proposal can either be a simple baffle, or a valve system.

To realize the function that, the UV liquid processing device can only be connected to the liquid source when assembled in place, and the liquid source must be disconnected before disassembly, the other proposal of hindering the installation of the external pipe can also be adopted. The said latching mechanism 1 also comprises a water nozzle stopper 12. The water nozzle stopper 12 is ganged with the said locking dog 11, so that when the said locking dog 11 retracts into the lamp holder 3, the said water nozzle stopper 12 can hinder the installation of external pipe 6 on the said water nozzle 5. When the said locking dog 11 stretches out from the lamp holder 3 and stretches into the lock holes 21 of the lamp holder fixed cover 2, the said water nozzle stopper 12 can move to the position where external pipe 6 can be installed on the said water nozzle 5.

Figure 4:
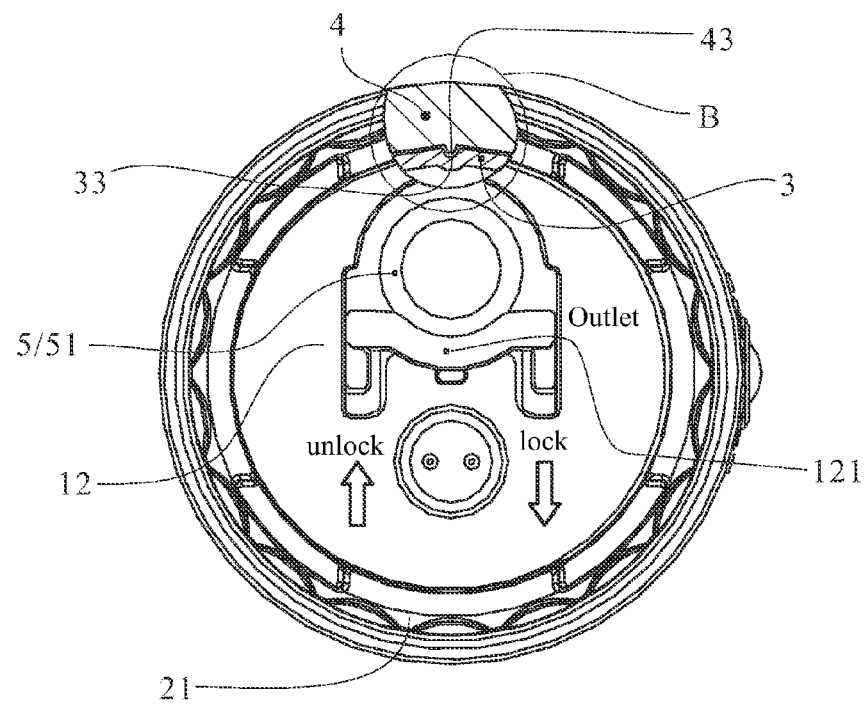
FIG. 4 shows an orthographic top view diagram of the said preferred embodiment, when the said locking dog has not stretched out from the lamp holder 3, and the indicating area B is sectioned.
Figure 5:
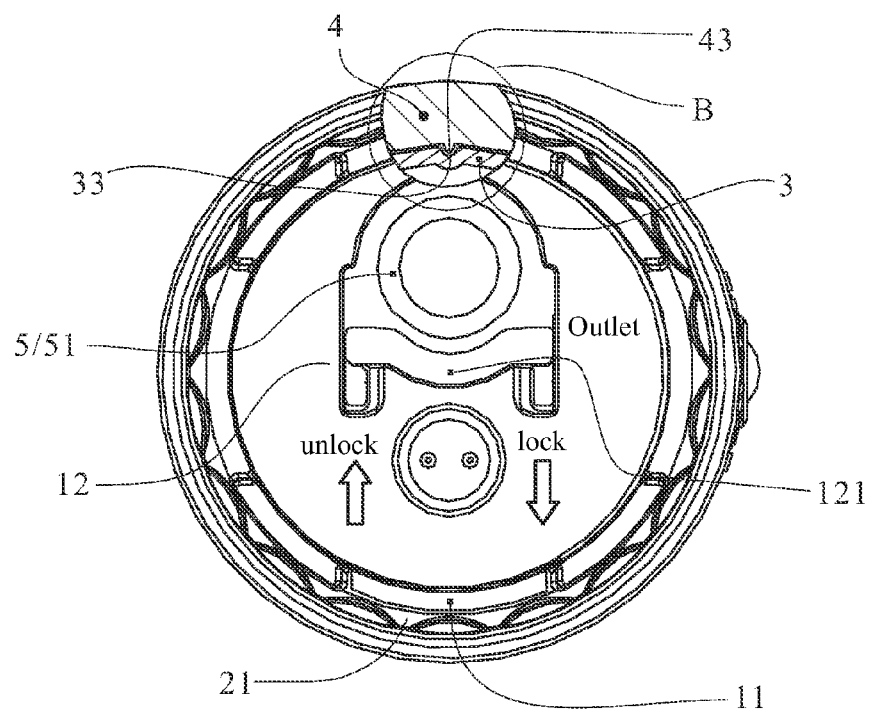
FIG. 5 shows an orthographic top view diagram of the said preferred embodiment, when the said locking dog stretches out from the lamp holder 3, and the indicating area B is sectioned.

In the preferred embodiment of the invention shown in FIG. 4 and FIG. 5, a tubular water nozzle 5 is arranged at the top of the said lamp holder 3. For the said preferred embodiment, the said water nozzle 5 is water outlet nozzle 51. In the above proposal by means of hindering the installation of external pipe, the said water nozzle stopper 12 is also arranged at the top of the lamp holder 3, comprising a catch 121. The water nozzle stopper 12 is ganged with the locking dog 12 to move at the top of the lamp holder 3, so that when the locking dog 11 retracts into the said lamp holder 3, catch 121 of the said water nozzle stopper 12 is close to the pipe external wall of the water nozzle 5, hindering the external pipe 6 from being encased on the said water nozzle 5 by virtue of the radial width from the top the catch 121 along the water nozzle 5. When the said locking dog 11 stretches out from the lamp holder 3 and enters the lock holes 21 of the lamp holder fixed cover 2, catch 121 of the said water nozzle stopper 12 moves toward the direction far away from the external pipe wall of the water nozzle 5. Thus, a gap is formed between the catch 121 and the pipe external wall of the water nozzle 5, enabling the external pipe 6 to be encased on the said water nozzle 5. The said external pipe 6 shall be a hollow tubular water pipe compatible with the water nozzle 5. As is shown in FIG. 6, the said external pipe can either be a straight pipe 61, or a bend 62.

At least one water nozzle 5 is arranged at the said lamp holder 3. Since both the water nozzle 5 and the latching mechanism 1 are arranged on the lamp holder 3, in the proposal of adopting the water nozzle stopper 12 with the above two methods, the said water nozzle stopper 12 is directly connected to the said locking dog 11, to realize linkage between the water nozzle stopper and the locking dog 11. Since function of the water nozzle stopper 12 can be realized so long as it acts on either the water inlet nozzle 52 or the water outlet nozzle 51. Therefore, water nozzle stated here can either be water inlet nozzle 52 or water outlet nozzle 51. In the preferred embodiment of the invention, a water outlet nozzle 51 is arranged on the lamp holder 3, and the said water inlet nozzle 52 is arranged at the bottom of the liquid processor 4.

Figure 2:
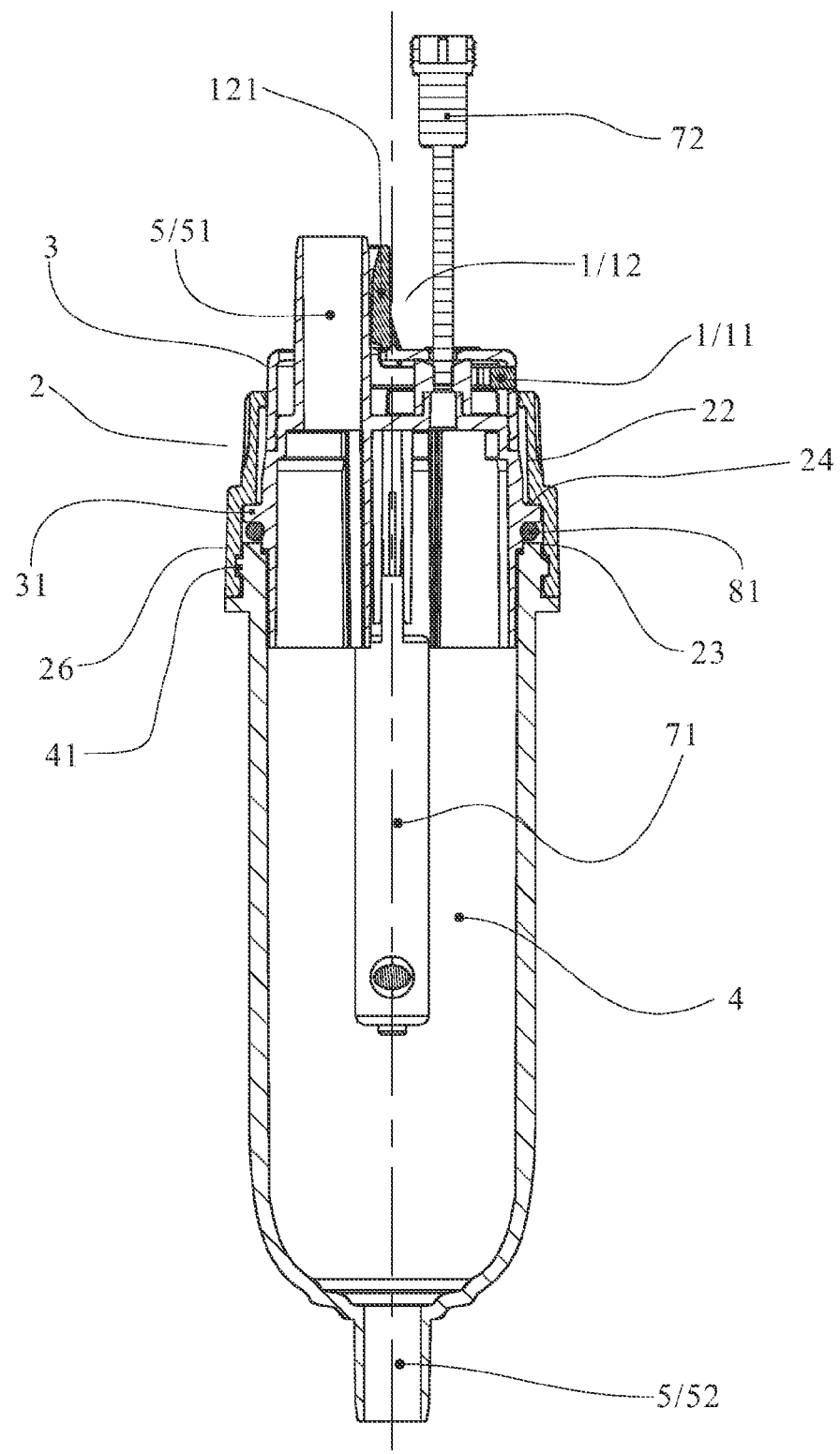
FIG. 2 shows an A-A sectional diagram of FIG. 1, when the locking dog 11 has not stretched out from the lamp holder 3.
Figure 3:
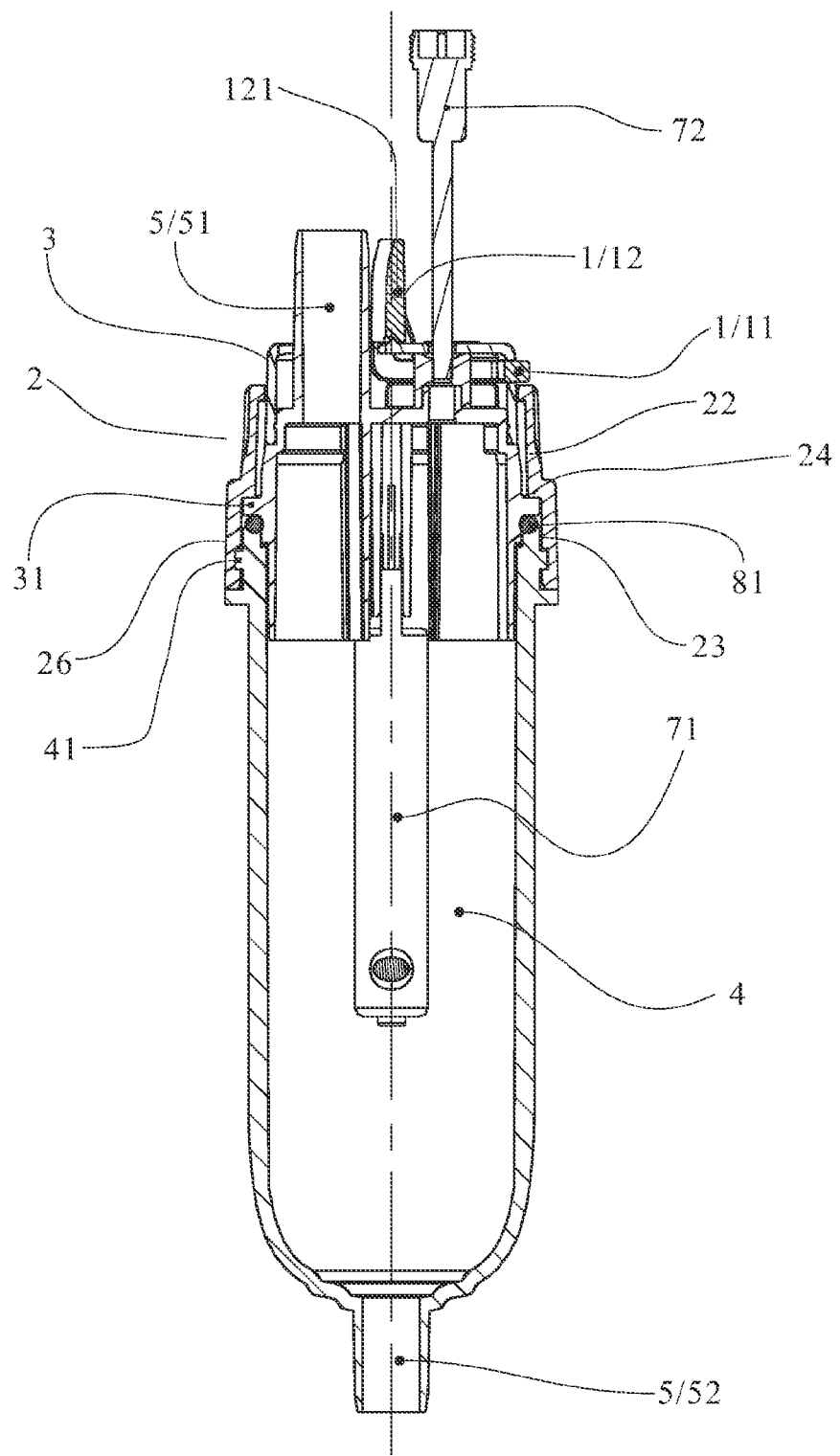
FIG. 3 shows an A-A sectional diagram of FIG. 1, when the said locking dog 11 stretches out from the lamp holder 3.
Figure 6:
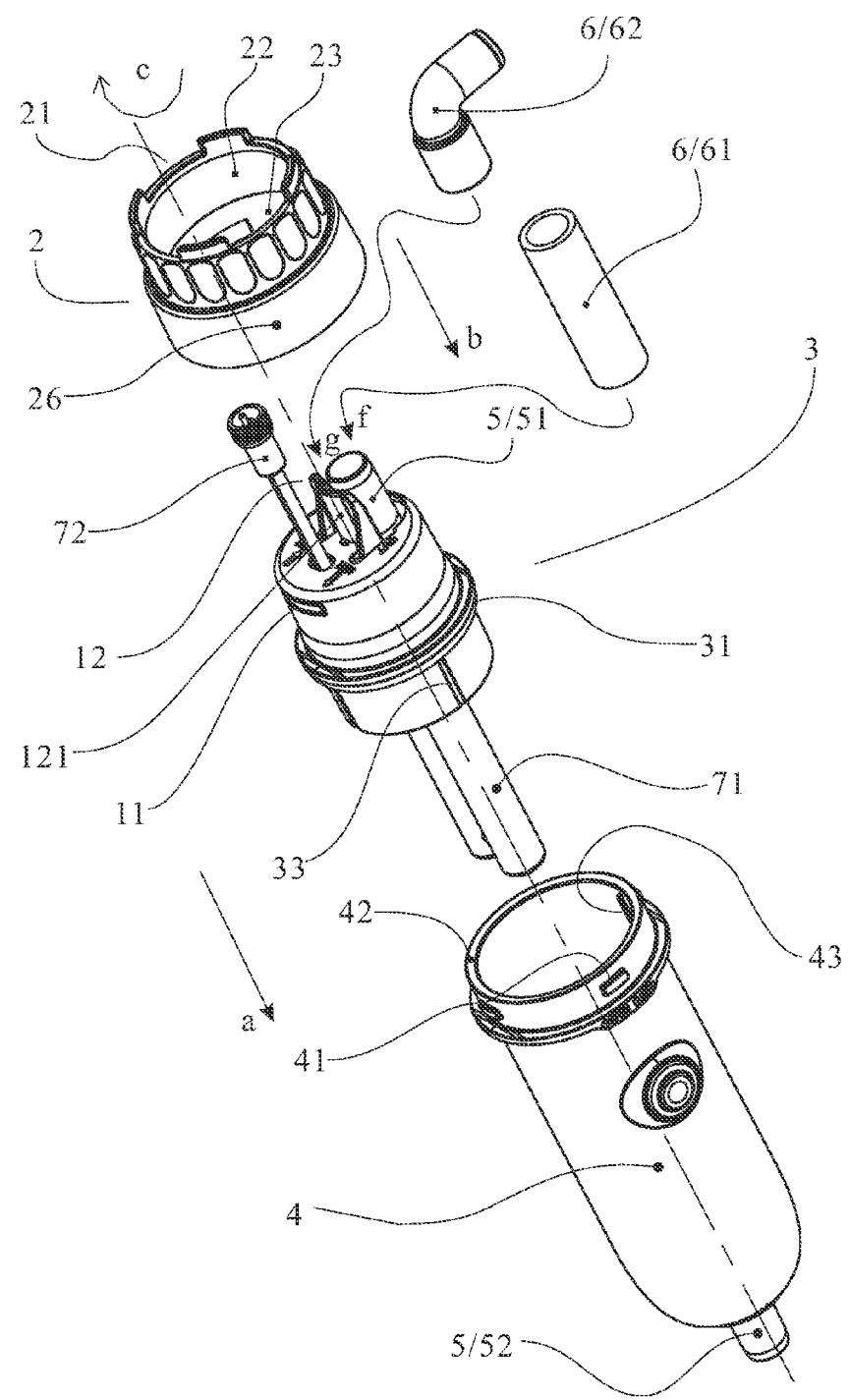
FIG. 6 shows an axonometric projection diagram of the said preferred embodiment at decomposition state.

In the preferred embodiment shown in FIG. 2, FIG. 3 and FIG. 6, the said lamp holder 3 comprises a protruding ridge 31 arranged on the external wall of the lamp holder 3, and protrudes to the outside of the lamp holder 3. By virtue of the said protruding ridge 31 erected at the opening edge of the said liquid processor 4, the said lamp holder 3 is installed on the liquid processor 4. The said lamp holder fixed cover 2 is hollow tubular, so that the lamp holder fixed cover presses the lamp holder on the liquid processor. Shape of the top inner wall 22 of the lamp holder fixed cover 2 is identical to that of the external wall of the said lamp holder 3 above the protruding ridge, and shape of the bottom inner wall 23 of the said lamp holder fixed cover 2 is identical to that of the external wall of the said liquid processor 4. Thus, a gland ring surface 24 is formed between the top inner wall 22 and the bottom inner wall 23 of the lamp holder fixed cover 2. When the said lamp holder fixed cover 2 is encased on the lamp holder 3 installed on the said liquid processor 4, by virtue of the said gland ring surface 24 pressed on the protruding ridge 31 of the said lamp holder 3, the said lamp holder fixed cover 2 presses the lamp holder 3 on the said liquid processor 4, to ensure the seal, and is detachably connected to the said liquid processor 4.

Figure 8:
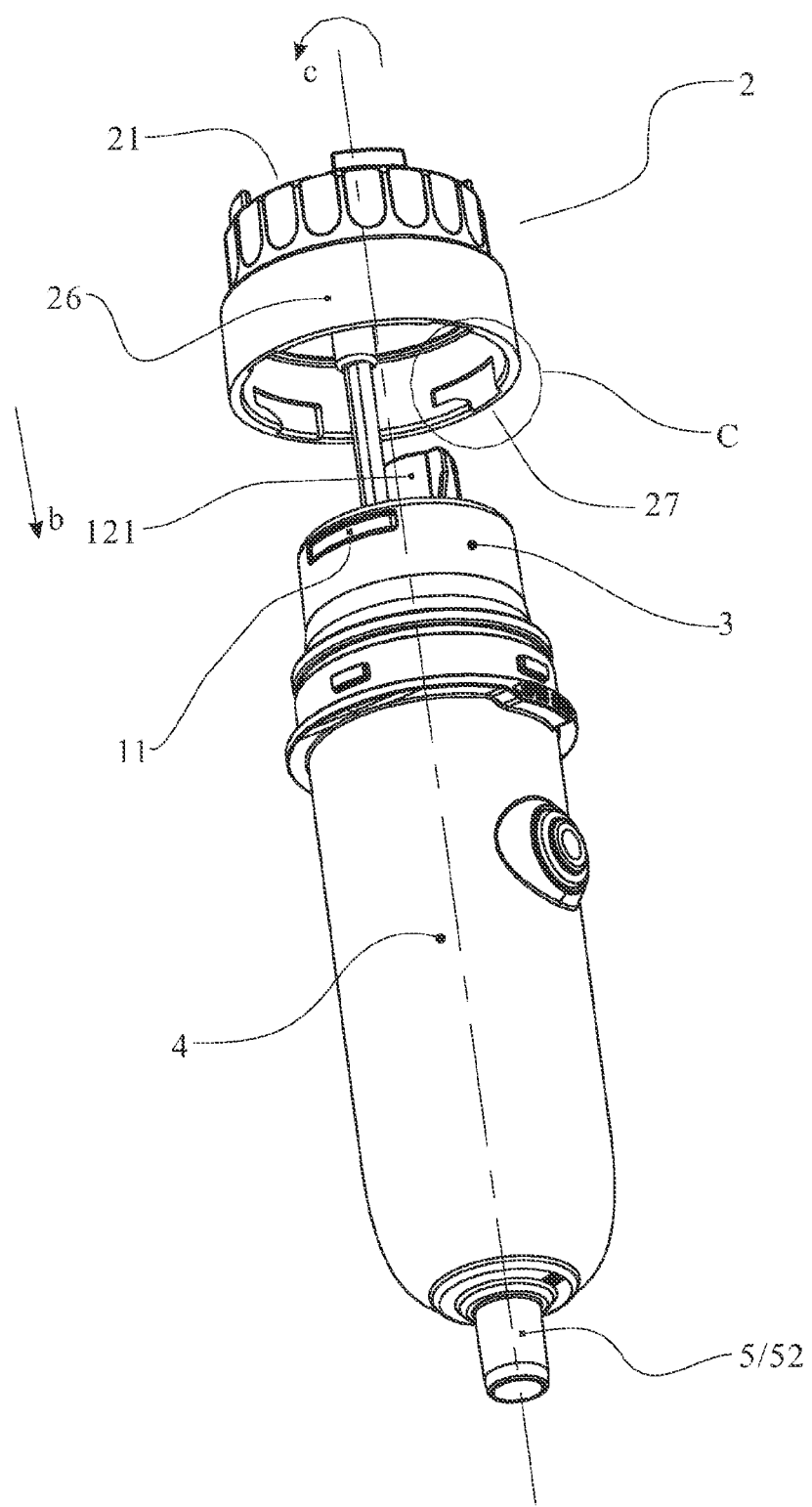
FIG. 8 shows an axonometric projection diagram of the decomposed lamp holder fixed cover 2 and liquid processor 4 installed with the lamp holder 3 of the said preferred embodiment.
Figure 9:
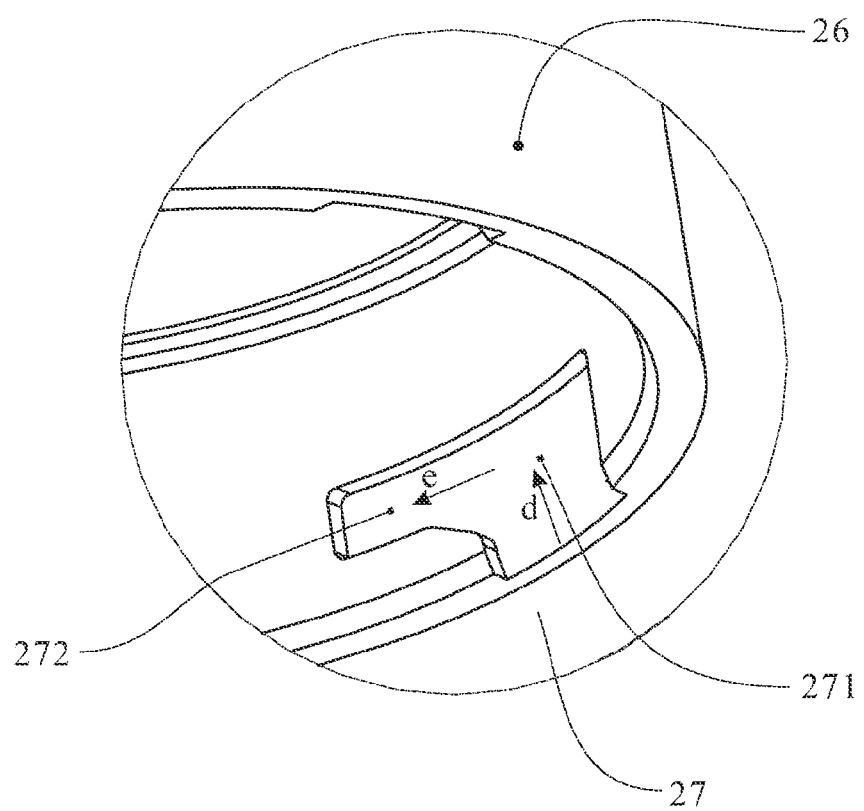
FIG. 9 shows a local amplified diagram of the indicating section C in FIG. 8.

In the preferred embodiment shown in FIG. 6, FIG. 8 and FIG. 9, at least one buckle convex 41 protruding outside from the liquid processor 4 is arranged on the external wall of the said liquid processor 4. The said lamp holder fixed cover 2 comprises a hollow tubular shaped bottom enclosure wall 26 arranged at the bottom of the lamp holder fixed cover 2. Shape of the inner wall 23 of the said bottom enclosure wall 26 is identical to that of the external wall of the liquid processor 4. In the preferred embodiment of the invention, specific shape of the said lamp holder fixed cover 2 is entirely hollow tubular. To enable the lamp holder fixed cover to be detachably connected to the liquid processor, at least one buckle slot 27 denting to the outside of the lamp holder fixed cover 2 is arranged at the inner wall 23 bottom of the said bottom enclosure wall 26. The buckle slot 27 comprises an entry slot 271 and a latching slot 272 interconnected with the entry slot 271. Notch of the said entry slot 271 is downward, and extends to the top of the lamp holder fixed cover 2. Notch of the latching slot 272 is interconnected with the top of the entry slot 271. Extension direction of the latching slot 272 is perpendicular to that of the entry slot 271. Thus, by virtue of the buckle convexes 41 sliding from the entry slots 271 into the latching slots 272, the said lamp holder fixed cover 2 is detachably connected to the liquid processor 4. In the preferred embodiment of the invention, the said lamp holder fixed cover 2 is arranged with for buckle slots 27, and extension direction of all the latching slots 272 are the same. With regard to the said preferred embodiment, extension direction of the said latching slots 272 are counter-clockwise direction.

As is shown from FIG. 4 to FIG. 6, since the lamp holder fixed cover 2 stated in the preferred embodiment of the invention is of hollow tubular shape, structure of the said lock hole 21 is that, at least one notch denting downward is processed at the top of the lamp holder fixed cover 2, the notch is the said lock hole 21. The said locking dog 11 can stretch out from and retract into the lamp holder 3 from the side face of the lamp holder 3, so that when the said lamp holder fixed cover 2 comprises the said lamp holder 3 and is connected to the said liquid processor 4, the said locking dog 11 can stretch out from the side face of the lamp holder 3, and enter into the lock holes 21 of the lamp holder fixed cover, restricting the said lamp holder fixed cover 2 from making upward displacement by virtue of the bottom edge of the lock holes 21, meanwhile restricting the said lamp holder fixed cover 2 from rotating by virtue of the vertical wall at both sides of the said lockholes 21. In the said preferred embodiment, four lock holes 21 are processed at the top of the lamp holder fixed cover 2.

To enable the lamp holder to be positioned and installed in the liquid processor, and prevent the lamp holder from rotating in the liquid processor, a standstill locking component is respectively arranged on the said liquid processor 4 and lamp holder 3. By virtue of the standstill locking components, the said lamp holder 3 is positioned and installed on the said liquid processor 4, and fails to rotate in the liquid processor 4.

In the preferred embodiment of the invention shown in FIG. 4 to FIG. 7, bottom external wall of the said lamp holder 3 is directly facing the top inner wall of the said liquid processor 4. At least one standstill locking groove 33 is processed at the bottom external wall of the said lamp holder 3. At least one standstill locking convex 43 protruding to the interior of the barrel is arranged at the top inner wall of the said liquid processor 4. By virtue of the standstill locking convexes 43 inserted into the said standstill locking grooves 33, the said lamp holder 3 is positioned and installed on the said liquid processor 4, and fails to rotate in the liquid processor 4. In the said preferred embodiment, four standstill locking grooves 33 are processed on the lamp holder 3, accordingly, four standstill locking grooves 43 are processed on the liquid processor. Similarly, implementation proposal of the other standstill locking component is that, process at least one standstill locking convex protruding to the outside of the lamp holder 3 is processed at the bottom external wall of the said lamp holder 3; set at least one standstill locking groove denting to the direction far away from the central axis at the top inner wall of the said liquid processor 4. Position and install the said lamp holder 3 on the said liquid processor 4 by virtue of the standstill locking convexes inserted into the said standstill locking grooves, and enable the lamp holder 3 to be incapable of rotating in the liquid processor 4.

Figure 7:
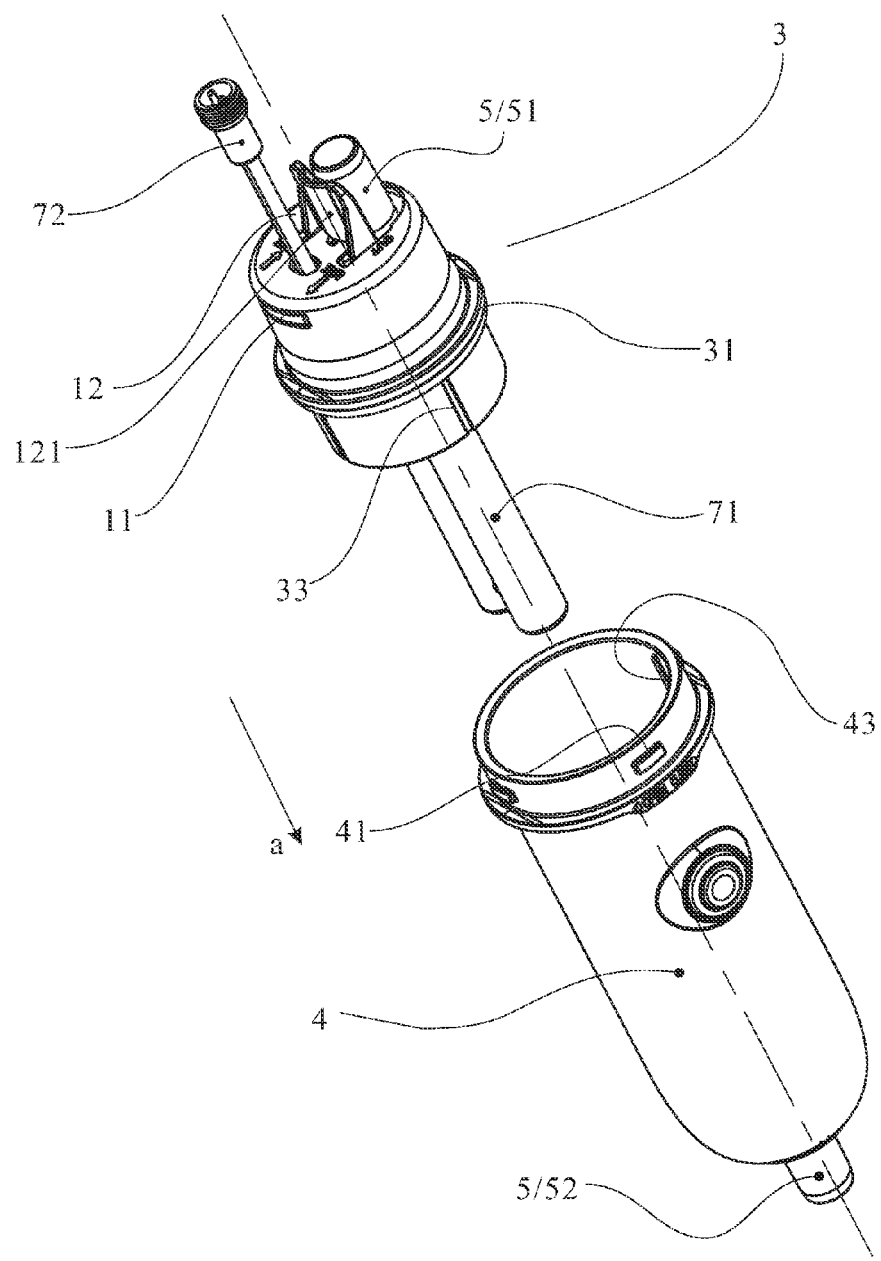
FIG. 7 shows an axonometric projection diagram of the decomposed lamp holder 3 and liquid processor 4 of the said preferred embodiment.

Integrating the detailed explanations of the above specific proposals, assembly process of the preferred embodiment of the invention is shown below:

As is shown in FIG. 6 and FIG. 7, position and install the lamp holder 3 in the liquid processor 4 by virtue of the standstill locking convexes 43 inserted into the standstill locking grooves 33 following the direction a, protruding ridge 31 of the said lamp holder 3 is erected on the barrel edge 42 of the liquid processor 4. Since angular displacement between the four pairs of standstill locking grooves 33 and standstill locking convexes 43 are 90°, installation direction of lamp holder 3 can be selected by virtue of standstill locking grooves 33 and standstill locking convexes 43, namely water discharge direction of the water outlet nozzle 51.

As is shown in FIG. 6, FIG. 8 and FIG. 9, encase the lamp holder fixed cover 2 on the lamp holder 3 and the liquid handler 4. As is shown in FIG. 2 and FIG. 3, by virtue of the gland ring surface 24 pressed on the protruding ridge 31, the said lamp holder fixed cover 2 presses the lamp holder on the liquid processor 4. Now, the four buckle convexes 41 of the said liquid processor 4 shall also be inserted into the respective entry slot 271 of the four buckle slots 27 of the said lamp holder fixed cover 2 according to the direction shown in FIG. 9.

As is shown in FIG. 6, FIG. 8 and FIG. 9, rotate the said lamp holder fixed cover 2 following the clockwise direction c, enable the four buckle convexes 41 of the liquid processor 4 to slide into the respective latching slots 272 of the four buckle slots 27 of the said lamp holder fixed cover 2 accordingly following the direction e shown in FIG. 9. Thus, the lamp holder fixed cover 2 is connected to the liquid processor 4. Therefore, by virtue of the corresponding buckle convexes 41 and buckle slots 27, the lamp holder fixed cover 2 is detachably connected to the liquid handler processor 4.

As is shown in FIG. 2 and FIG. 4, via the above process, locking dog 11 of the said latching mechanism 1 still retracts into the lamp holder 3, and the said latching mechanism 1 is still at the locking status. Catch 121 of the said water nozzle stopper 12 relies against the pipe external wall of the said water outlet pipe 51. Thicken the pipe external wall of the water outlet nozzle 51 by virtue of the width at the top of the sad catch 121, thus enabling the external pipe 6 to fail to be installed on the water outlet nozzle 51. To contact with the water outlet nozzle 51 in a better way, shape of the central surface at one side where the said catch 121 is directly facing the water outlet nozzle 51 is identical to that of the partial external wall surface of the water outlet nozzle 51 faced directly to the catch 121.

Push the locking dog 11 of the said latching mechanism 1 out from the lamp holder 3. Thus, the locking dog 11 stretches out from the side face of the lamp holder 3, and stretches into the top notches of the lamp holder fixed cover 2, namely the lock holes 21, enabling the latching mechanism 1 to be at the locking status. As is shown in FIG. 3 and FIG. 5, the said locking dog 11 is tabulate, width of the said lock holes 21 shall just be identical to that of the locking dog 11. Thus, the locking dog 11 stretching into the lock holes 21 is restricted between the two vertical walls constituting the top notches the said lamp holder fixed cover 2, and the lamp holder fixed cover 2 fails to rotate. The said locking dog 11 presses on the bottom edge of the said lock hole 21, namely bottom edge of the top notches of the lamp holder fixed cover 2, restricting the said lamp holder fixed cover 2 from making upward displacement. Besides, as the locking dog 11 stretches out from the lamp holder 3, catch 121 of the water nozzle stopper 12 connected to the root of the said locking dog 11 also makes transverse movement to the direction far away from the pipe external wall of the water outlet nozzle 51. Finally, when the locking dog 11 stretches into the lock holes 21, a gap is formed between the catch 121 and the water outlet nozzle 51. With the gap, the external pipe 6 is just encased on the water outlet nozzle 51, thus the water nozzle stopper moves to the position where external pipe 6 can be installed on the water outlet nozzle 51.

Finally, as is shown in FIG. 6, the bend 62 which serves as the said external pipe 6 can be encased on the said water outlet nozzle 51 following direction g; and the straight pipe 61 which serves as the said external pipe 6 can also be encased on the said water outlet nozzle 51 following direction f. The said straight pipe 61 and bend 62 are water pipes of different shapes of external pipe 6 adopted as per different application situations in the said preferred embodiment. Water nozzle stopper 12 comprising the catch 121 stated in the invention can play its role against the said straight pipe 61 and bend 62, that is when the locking dog 11 retracts into the lamp holder 3, catch 121 is close to the pipe external wall of the water outlet nozzle 51, hindering the external pipe 6 from being encased on the said water outlet nozzle 51 by virtue of the radial width of the catch 121 top along the water nozzle 5. When the said locking dog 11 stretches out from the lamp holder 3 and enters the lock holes 21 of the lamp holder fixed cover 2, catch 121 of the said water nozzle stopper 12 moves to the direction far away from the pipe external wall of the water nozzle 5, a gap is formed between the catch 121 and the pipe external wall of the water nozzle 5, thus the straight pipe 61 or the bend 62 can be encased on the said water outlet nozzle 51.

When the latching mechanism 1 of the preferred embodiment of the invention is at locking status, it also hinders catch 121 from moving to the direction of the pipe external wall of the water outlet nozzle 51 by virtue of the pipe external wall of the external pipe 6 encased on the water outlet nozzle 51, namely hindering the latching mechanism 1 from moving to the position where locking status is relieved, so as to ensure that the latching mechanism 1 can maintain the locking status. Since installation of external pipe 6 for the water outlet nozzle 51 and water inlet nozzle 52 are at the same operating step, disassembly of the external pipe 6 means disconnection of water source. Therefore, the latching mechanism 1 can only be moved to the locking release status when the external pipe 6 is disassembled, namely the water source is disconnected.

What is claimed is:

1. A latching method ensuring that UV liquid processing device is reliably sealed, the said UV liquid processing device comprises a deep cylindrical liquid processor, a lamp holder installed with a UV lamp, as well as water nozzles interconnected to the interior of the liquid processor; the said water nozzle comprises a water inlet nozzle and a water outlet nozzle; the said method comprises the following steps:

A. set a lamp holder fixed cover, so that the lamp holder fixed cover to press the lamp holder on the said liquid processor, to ensure the seal, and enable the said lamp holder fixed cover to be detachably connected to the said liquid processor;
B. in the process of implementing the said Step A, set at least one lock hole on the said lamp holder fixed cover;
C. set a latching mechanism comprising a locking dog in the said lamp holder; the locking dog can stretch out from the lamp holder and retract into the said lamp holder; so that when the said lamp holder fixed cover is pressed on the said lamp holder and connected to the said liquid processor, the said locking dog stretches out from the lamp holder, and enters the lock holes of the lamp holder fixed cover; thus, the lamp holder fixed cover is locked and incapable of moving.

2. The latching method ensuring that UV liquid processing device is reliably sealed according to claim 1 is characterized in that:
it further comprises the following steps,
D1. set a water nozzle stopper for the latching mechanism stated in Step C, so that the water nozzle stopper is ganged with the said locking dog; when the said locking dog retracts into the lamp holder, the said water nozzle stopper can block off the water nozzle; when the said locking dog stretches out from the lamp holder, and enters the lock holes of the lamp holder fixed cover, the said water nozzle stopper moves along with the locking dog to the position where blocking of the water nozzle is relieved.

3. The latching method ensuring that UV liquid processing device is reliably sealed according to claim 1 is characterized in that:
it further comprises the following steps,
D2. set a water nozzle stopper for the latching mechanism stated in Step C, so that the water nozzle stopper can be ganged with the said locking dog; when the said locking dog retracts into the lamp holder, the said water nozzle stopper can hinder the installation of external pipe on the said water nozzle; when the said locking dog stretches out from the lamp holder, and enters the lock holes of the lamp holder fixed cover, the said water nozzle stopper moves to the position where external pipe can be installed on the said water nozzle.

4. The latching method ensuring that UV liquid processing device is reliably sealed according to claim 3 is characterized in that:
set a tubular water nozzle at the top of the said lamp holder, step D2 comprises the following substeps,
D21. set a water nozzle stopper comprising a catch for the said latching mechanism, the said water nozzle stopper is installed at the top of the lamp holder, ganged with the said locking dog to move at the top of the lamp holder; when the locking dog retracts into the said lamp holder, catch of the said water nozzle stopper is close to the pipe external wall of the water nozzle, hindering the external pipe from being encased on the said water nozzle by virtue of the radial width of the catch top along the water nozzle; when the said locking dog stretches out from the lamp holder and enters the lock holes of the lamp holder fixed cover, catch of the said water nozzle stopper moves to the direction far away from the pipe external wall of the water nozzle, and a gap is formed between the said catch and the pipe external wall of the water nozzle; thus, external pipe can be encased on the said water nozzle.

5. The latching method ensuring that UV liquid processing device is reliably sealed according to claim 2 is characterized in that:

Set at least one water nozzle on the said lamp holder, in the said Step D, connect the said water nozzle stopper securely to the locking dog stated in Step C, to realize linkage between the water nozzle stopper and the locking dog.

6. The latching method ensuring that UV liquid processing device is reliably sealed according to claim 1 is characterized in that:

external wall of the said lamp holder is arranged with a protruding ridge, when the lamp holder is installed on the liquid processor, the said protruding ridge is erected at the opening edge of the said liquid processor, the said Step A comprises the following substeps, A1. fabricate the said lamp holder fixed cover into tubular shape, inner wall of the lamp holder fixed cover comprises the top inner wall at the upward side and the bottom inner wall at the downward side, enable shape of the said top inner wall to be identical to that of the external wall of the said lamp holder above the protruding ridge, and shape of the said bottom inner wall to be identical to that of the external wall of the said liquid handler, thus, a gland ring surface is formed between the top inner wall and bottom inner wall of the lamp holder fixed cover; when the said lamp holder fixed cover is encased on the lamp holder installed on the said liquid processor, by virtue of the said gland ring surface pressed on the protruding ridge of the said lamp holder, the said lamp holder fixed cover presses the lamp holder on the said liquid processor, so as to ensure the seal, and is detachably connected to the said liquid processor.

7. The latching method ensuring that UV liquid processing device is reliably sealed according to claim 1 is characterized in that:

at least one buckle convex protruding outside from the liquid processor is arranged on the external wall of the said liquid processor, the said Step A comprises the following substeps:

A2. fabricate a lamp holder fixed cover whose bottom is provided with a tubular bottom enclosure wall, shape of the inner wall of the said bottom enclosure wall is identical to that of the external wall of the liquid processor, and set at least one buckle slot denting to the outside of the lamp holder fixed cover at the inner wall bottom of the said bottom enclosure wall, the buckle slot comprises an entry slot, and a latching slot interconnected with the entry slot; notch of the said entry slot is downward, and extends to the top of the lamp holder fixed cover, notch of the said latching slot is interconnected with the top of the entry slot, extension direction of the latching slot is perpendicular to that of the entry slot, thus, by virtue of the buckle convex sliding from the entry slot into the latching slot, the said lamp holder fixed cover is detachably connected to the liquid processor.

8. The latching method ensuring that UV liquid processing device is reliably sealed according to claim 1 is characterized in that:

the said Step B comprises the following steps,

B1. fabricate a tubular lamp holder fixed cover, and process at least one notch denting downward at the top of the lamp holder fixed cover, the notch is the said lock hole; steps C shall comprise the following substeps, C1. set a latching mechanism comprising a locking dog inside of the said lamp holder, the locking dog can stretch out from and retract into the said lamp holder from the side face of the lamp holder, when the said lamp holder fixed cover compresses the said lamp holder and is connected to the said liquid processor, the said locking dog can stretch out from the lamp holder, and enter into the lock holes of the lamp holder fixed cover, restricting the said lamp holder fixed cover from making upward displacement by virtue of the bottom edge of the lock holes, meanwhile, restricting the said lamp holder fixed cover from rotating by virtue of the vertical wall at both sides of the said lock holes.

9. The latching method ensuring that UV liquid processing device is reliably sealed according to claim 1 is characterized in that:

it further comprises the following steps,

E. set a standstill locking component respectively on the said liquid processor and the lamp holder, by virtue of the standstill locking component, the said lamp holder is positioned and installed on the said liquid processor, and incapable of rotating in the liquid processor.

10. The latching method ensuring that UV liquid processing device is reliably sealed according to claim 9 is characterized in that:

bottom external wall of the said lamp holder and top inner wall of the said liquid processor are directly facing and contacting to each other, the said Step E comprises the following substeps, E11. process at least one standstill locking groove denting to the inside of the lamp holder at the bottom external wall of the said lamp holder;

E12. set at least one standstill locking convex protruding to the inside of the barrel at the top inner wall of the said liquid processor, by virtue of the standstill locking convexes sliding into the said standstill locking grooves, the said lamp holder is positioned and installed on the said liquid processor, and fails to rotate in the liquid processor.

11. The latching method ensuring that UV liquid processing device is reliably sealed according to claim 9 is characterized in that:

bottom external wall of the said lamp holder and top inner wall of the said liquid processor are directly facing to each other, the said step E comprises the following substeps, E21. process at least one standstill locking convex protruding to the outside of the lamp holder at the bottom external wall of the said lamp holder;

E22. set at least one standstill locking groove denting to the outside of the barrel at the top inner wall of the said liquid processor, by virtue of the standstill locking convexes sliding into the said standstill locking grooves, the said lamp holder is positioned and installed on the said liquid processor, and fails to rotate in the liquid processor.

12. A UV liquid processing device realizing reliable seal by virtue of latching comprises a deep cylindrical liquid processor, a lamp holder installed with a UV lamp, as well as water nozzle interconnected with the interior of the liquid processor; the said water nozzle comprises a water inlet nozzle and a water outlet nozzle, featuring that:

it also comprises a latching mechanism, as well as a lamp holder fixed cover arrange with lock hole;

the said lamp holder fixed cover presses the lamp holder on the said liquid processor, and is detachably connected to the liquid processor;

the said latching mechanism is installed inside of the said lamp holder, comprising a locking dog which can stretch out from the lamp holder or retract into the said lamp holder;

when the said lamp holder fixed cover presses the lamp holder on the said liquid processor and is connected to the said liquid processor, the said locking dog stretches out from the lamp holder, and enters the lock holes of the said lamp holder fixed cover, thus, the said lamp holder fixed cover is locked and can't move.

13. The UV liquid processing device realizing reliable seal by virtue of latching according to claim 12 is characterized in that:

the said latching mechanism also comprises a water nozzle stopper, the water nozzle stopper is ganged with the said locking dog, when the said locking dog retracts into the lamp holder, the said water nozzle stopper can block off the water nozzle, when the said locking dog stretches out from the lamp holder, and enters the lock holes of the lamp holder fixed cover, the said water nozzle stopper moves along with the locking dog to the position where blocking of water nozzle is relieved.

14. The UV liquid processing device realizing reliable seal by virtue of latching according to claim 12 is characterized in that:

the said latching mechanism also comprises a water nozzle stopper, the water nozzle stopper is ganged with the said locking dog, when the said locking dog retracts into the lamp holder, the said water nozzle stopper can hinder the installation of external pipe on the said water nozzle; when the said locking dog stretches out from the lamp holder, and enters the lock holes of the lamp holder fixed cover, the said water nozzle stopper moves to the position where external pipe can be installed on the said water nozzle.

15. The UV liquid processing device realizing reliable seal by virtue of latching according to claim 14 is characterized in that:

a tubular water nozzle is arranged at the top of the said lamp holder; the said water nozzle stopper is also arranged at the top of the lamp holder, comprising a catch, the water nozzle stopper is ganged with the locking dog to move at the top of the lamp holder, when the locking dog retracts into the said lamp holder, catch of the said water nozzle stopper is close to the pipe external wall of the water nozzle, hindering the external pipe from being encased on the said water nozzle by virtue of the radial width of the catch top along the water nozzle, when the said locking dog stretches out from the lamp holder and enters the lock holes of the lamp holder fixed cover, catch of the said water nozzle stopper moves to the direction far away from the pipe external wall of the water nozzle, a gap is formed between the said catch and the pipe external wall of the water nozzle, thus, external pipe can be encased on the said water nozzle.

16. The UV liquid processing device realizing reliable seal by virtue of latching according to claim 13 is characterized in that:

at least one water nozzle is arranged at the said lamp holder, the said water nozzle stopper is directly connected to the said locking dog, so as to realize linkage between the water nozzle stopper and the locking dog.

17. The UV liquid processing device realizing reliable seal by virtue of latching according to claim 12 is characterized in that:

the said lamp holder comprises a protruding ridge arranged on the external wall of the lamp holder and protrudes to the outside of the lamp holder, by virtue of the said protruding ridge erected at the barrel opening edge of the said liquid processor, the said lamp holder is installed on the liquid processor;

the said lamp holder fixed cover is of hollow tubular shape, shape of the top inner wall of the lamp holder fixed cover is identical to that of the external wall of the said lamp holder above the protruding ridge, and shape of the bottom inner wall of the said lamp holder fixed cover is identical to that of the external wall of the said liquid processor, thus, a gland ring surface is formed between the top inner wall and the bottom inner wall of the lamp holder fixed cover;

when the said lamp holder fixed cover is encased on the lamp holder installed on the said liquid processor, by virtue of the said gland ring surface pressed on the protruding ridge of the said lamp holder, the said lamp holder fixed cover presses the lamp holder on the said liquid processor to ensure the seal, and is detachably connected to the said liquid processor.

18. The UV liquid processing device realizing reliable seal by virtue of latching according to claim 12 is characterized in that:

external wall of the said liquid processor is arranged with at least one buckle convex protruding to the outside of the liquid processor;

The said lamp holder fixed cover comprises a tubular bottom enclosure wall arranged at the bottom of the lamp holder fixed cover, and shape of the inner wall of the said bottom enclosure wall is identical to that of the external wall of the liquid processor;

at least one buckle slot denting to the outside of the lamp holder fixed cover is arranged at inner wall bottom of the said bottom enclosure wall, the buckle slot comprises an entry slot and a latching slot interconnected with the entry slot, notch of the said entry slot is downward, and extends to the top of the lamp holder fixed cover, notch of the latching slot is interconnected with the top of the entry slot, extension direction of the latching slot is perpendicular to that of the entry slot, thus, by virtue of the buckle convex sliding from the entry slot into the latching slot, the said lamp holder fixed cover is detachably connected to the liquid processor.

19. The UV liquid processing device realizing reliable seal by virtue of latching according to claim 12 is characterized in that:

the said lamp holder fixed cover is of tubular shape, at least one notch concaving downward is processed at the ring wall top of the lamp holder fixed cover, the notch is the said lock hole;

the said locking dog can stretch out from and retract into the lamp holder from the side face of the lamp holder, when the said lamp holder fixed cover compresses the said lamp holder and connects to the said liquid processor, the said locking dog can stretch out from the side face of the lamp holder, and enter the lock holes of the lamp holder fixed cover, restricting the said lamp holder fixed cover from making upward displacement by virtue of the lock holes, meanwhile restricting the lamp holder fixed cover from rotating by virtue of the vertical wall at both sides of the said lock holes.

20. The UV liquid processing device realizing reliable seal by virtue of latching according to claim 12 is characterized in that:

a standstill locking component is respectively arranged on the said liquid processor and the lamp holder, by virtue of the standstill locking component, the said lamp holder is positioned and installed on the said liquid processor, and fails to rotate in the liquid processor.

21. The UV liquid processing device realizing reliable seal by virtue of latching according to claim 20 is characterized in that:

bottom external wall of the said lamp holder and top inner wall of the said liquid processor are directly facing to each other, at least one standstill locking groove denting into the lamp holder is arranged at the bottom external wall of the said lamp holder, at least one standstill locking convex protruding into the barrel is arranged at the top inner wall of the said liquid processor, by virtue of the standstill locking convex sliding into the said standstill locking groove, the said lamp holder is positioned and installed on the said liquid processor, and fails to rotate in the liquid processor.

22. The UV liquid processing device realizing reliable seal by virtue of latching according to claim 20 is characterized in that:

bottom external wall of the said lamp holder and top inner wall of the said liquid processor are directly facing to each other, at least one standstill locking convex protruding to the outside the lamp holder is processed at the bottom external wall of the said lamp holder, at least one standstill locking groove denting to the direction far away from the central axis is arranged at the top inner wall of the said liquid processor, by virtue of the standstill locking convex slid into the said standstill locking groove, the said lamp holder is positioned and installed on the said liquid processor, and fails to rotate in the liquid processor.

* * * * *